July 26, 1960     H. COANDA     2,946,540
JET PROPELLED AIRCRAFT

Filed July 21, 1954     5 Sheets-Sheet 1

INVENTOR
Henri Coanda
BY
ATTORNEYS

INVENTOR
Henri Coanda

July 26, 1960  H. COANDA  2,946,540
JET PROPELLED AIRCRAFT

Filed July 21, 1954  5 Sheets-Sheet 3

INVENTOR
Henri Coanda
BY
ATTORNEYS

July 26, 1960  H. COANDA  2,946,540
JET PROPELLED AIRCRAFT
Filed July 21, 1954  5 Sheets-Sheet 4

INVENTOR
Henri Coanda
BY
ATTORNEYS

July 26, 1960  H. COANDA  2,946,540
JET PROPELLED AIRCRAFT
Filed July 21, 1954  5 Sheets-Sheet 5

INVENTOR
Henri Coanda
BY
ATTORNEYS

United States Patent Office 2,946,540
Patented July 26, 1960

2,946,540
JET PROPELLED AIRCRAFT

Henri Coanda, Paris, France, assignor to Sebac Nouvelle S.A., Lausanne, Switzerland, a corporation of Switzerland Filed July 21, 1954, Ser. No. 444,869

Claims priority, application France Sept. 13, 1948

3 Claims. (Cl. 244—15)

This invention relates to an aircraft which necessitates much less power for its propulsion in the air than the known aircraft, thus considerably reducing the fuel consumption of said aircraft.

One object of the present invention is to provide the regulation of the gas output of the propelling parts and, more particularly, of the compressor unit included in the aircraft without substantially modifying its speed of rotation and the supplied pressure.

The aircraft which are now in use are propelled either by a traction submitted to the assembly or by a thrust, the necessary means to obtain these results being arranged either in front or in the rear of said assembly, and influencing the atmosphere surrounding the aircraft.

Another object of this invention is, on the contrary, to blow the wings and driving members of the aircraft by means of a source of power mounted within the aircraft, which delivers gas at a determined pressure.

To this purpose, a so-called COANDA slit is provided, which runs along the wings, at a certain distance from their front edge and, preferably, in a continuous manner. This so-called COANDA slit is such that one of its rims extends in a direction continually deviating away from the direction of the median plane of emergence, said plane forming an angle between 25° and 75° at its junction line with the tangent plane to the enveloping profile of the considered wing.

On the other hand, this slit is such that the ends of its delimiting rims are rolled round the ends of the wing, preferably, in form of a spindle to end against the lower surface of the wing.

The blown control members consist of fixed and movable tail surfaces used as controls or rudders for elevation and/or direction, and provided with slits similar to those described for the wing, running parallel to the front edges of said control members and, preferably, in a continuous manner and through which slits air or another gas is blown from inside the aircraft. Said slits are preferably located at a distance ranging between $1/24$ and $9/24$ of the total width of said control members, distance which is measured from the front edge.

Finally, the source of power set up within the aircraft and which delivers a gas under pressure on said wings and said control members can consist of one or more turbo reactors, i.e., one or more assemblies on a same shaft of an air compressor and of a turbine. The excess of air or compressed gas produced for supplying the wing slits and control members can be evacuated into nozzles to increase the propelling force obtained by said slits on the wings and control members, said nozzles being located either behind the fuselage or behind the engine nacelles, or behind the spindles of the wing ends, or further at the trailing edge of the wing or of the control members or at any desired place. The delivery of such nozzles can, if necessary, be regulated at will.

Still another object of this invention is an aircraft including all these particularities.

The air produced by the power supply is preferably produced at a pressure ranging from 40 to 100 grams per square centimetre, when a great performance is to be obtained, that is to say a high propelling effect for a low energy expense. This pressure will naturally vary according to each particular case and according to the results which are to be obtained from the aircraft and the energetic capacity of the available engines, e.g., one turbine and one compressor.

According to requirements, there will be needed, for one and the same machine, various air outputs at different intervals and, in this case, especially when a centrifugal compressor is used, the output will have to be controlled; if the same pressure has to be obtained for these different outputs the speed of rotation of the compressor shall have to remain substantially the same, thus involving the application of a system reducing the size of blades; in this manner, the capacity of the air compressing member will be maintained.

Still another object of the present invention is a system for the regulation of such an output.

A more detailed description of this invention is given hereinafter with reference to the accompanying drawings illustrating various embodiments, and in which.

Figure 1:
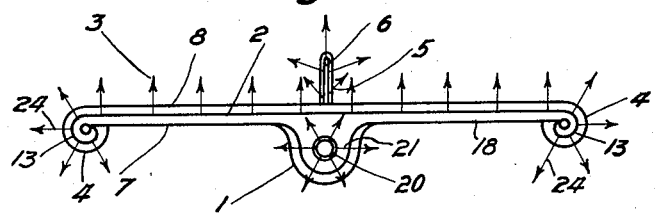
Figs. 1, 2 and 3 represent: a front view, a side elevation and a top view, respectively, of a first embodiment of an aircraft designed with the characteristics of the present invention.
Figure 2:
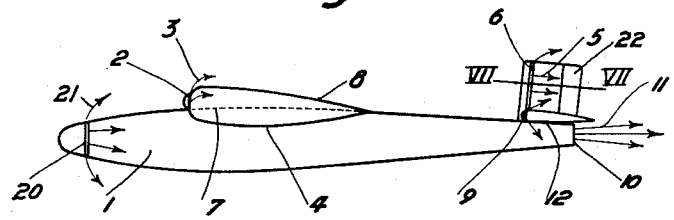
Figure 3:
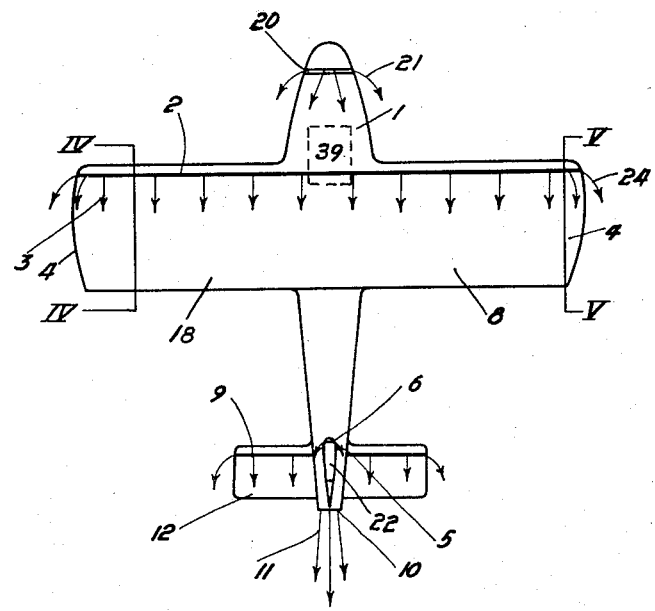
Figure 4:
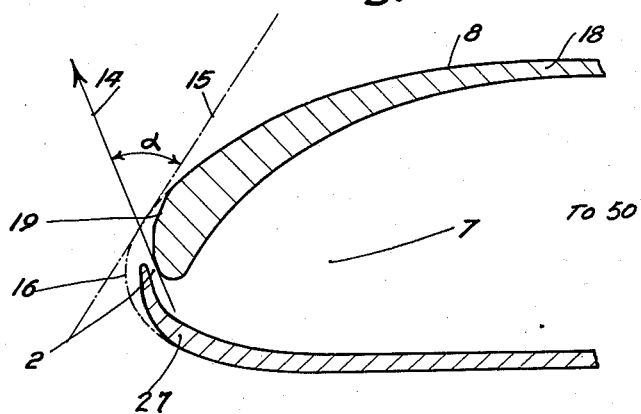
Fig. 4 is a sectional view (along IV—IV of Fig. 3) of a slit provided on the wing unit.
Figure 5:
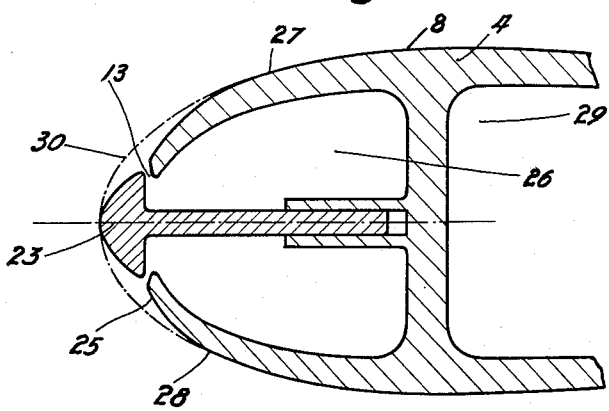
Figs. 5 and 6 are respectively a sectional view (along V—V of Fig. 3) and a front view of a portion of the spindles delimiting the ends of the wings, Fig. 6 being an enlarged view of a portion of Fig. 1.
Figure 6:
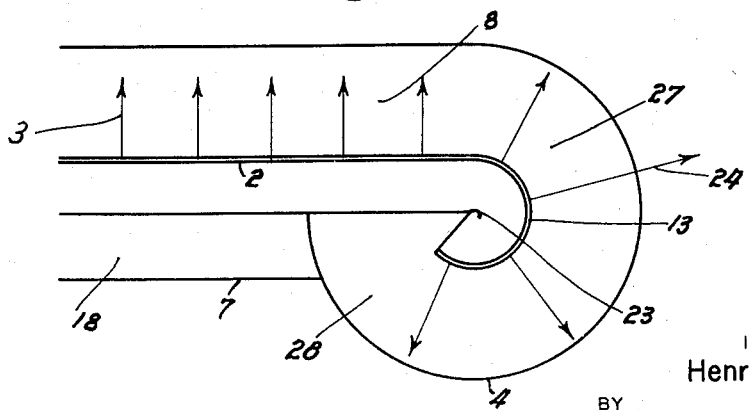
Figure 7:
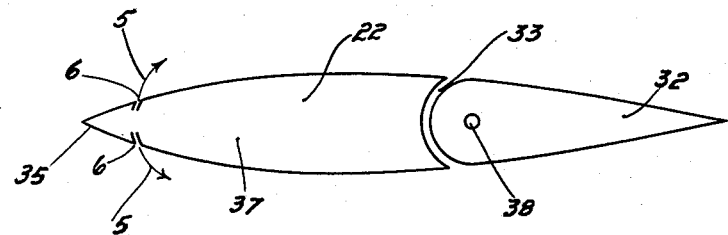
Fig. 7 is a sectional view of a driving member along VII—VII of Fig. 2.
Figure 8:
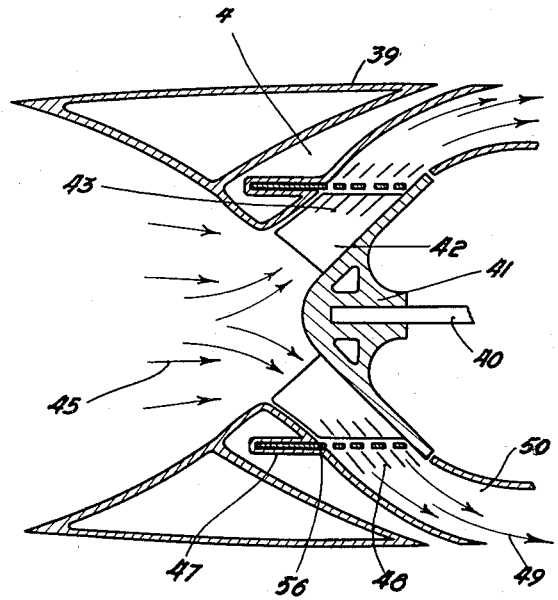
Fig. 8 shows the means for regulating the output of a centrifugal compressor operating at a substantially constant rate and disposed inside an aircraft according to the first embodiment.
Figure 10:
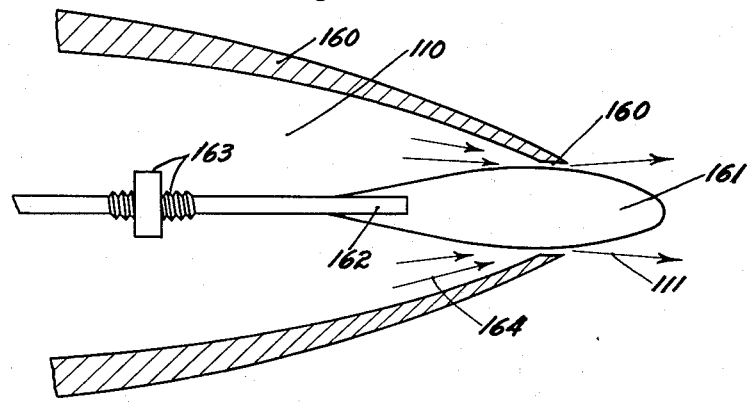
Fig. 10 is an enlarged view in section of the rear portion of the aircraft of Fig. 9.
Figure 9:
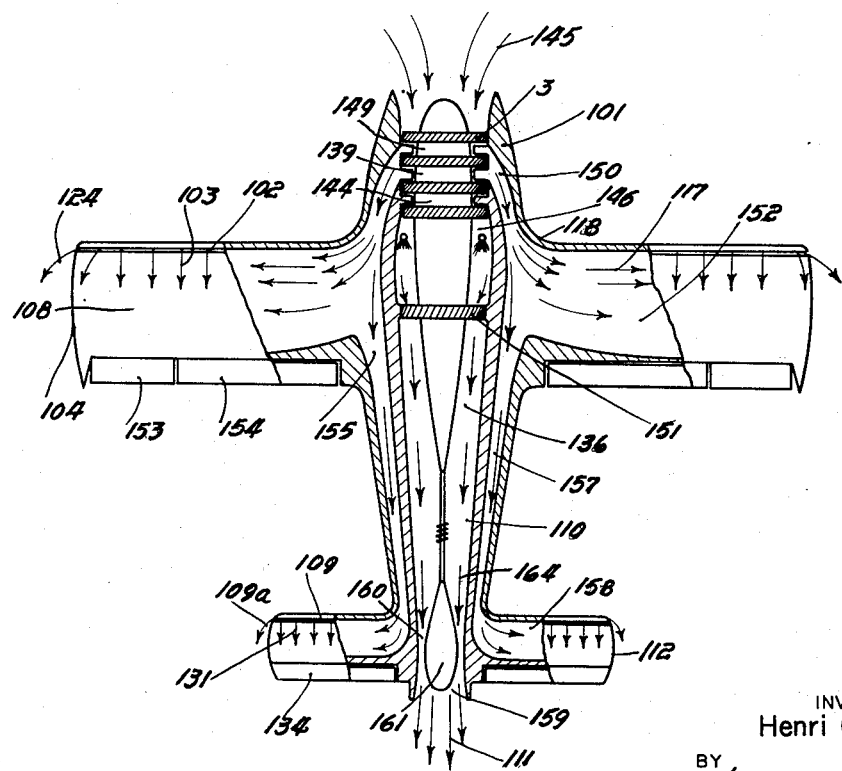
Fig. 9 is a diagrammatical view in longitudinal section of an aircraft according to a second embodiment of the invention and operating with a turbo-reactor.

The diagrammatical views shown by Figs. 1, 2 and 3 correspond to an airdraft 1, provided, along its monoplane wing unit or wing units 18, with a slit 2 running parallel to the front edge of said wing unit. Through said slit 2, air 3 escapes which falls back upon the top surface or extrados 8 of the wing unit 18, owing to the characteristics of said slit 2. At the ends of the wing unit, there are spindles 4 at the front edges of which slit 2 rolls up as slit 13 to end against the lower surface 7 of the wing unit. A slit 20 of the same kind as slit 2 is provided in front of the fuselage and air 21 escapes through said slit 20; in the rear of said fuselage, there is a rudder 22 having a slit 6 running along both sides of said rudder, and through which air 5 escapes and falls back upon and around the rudder 22 in the same manner as aforementioned in connection with the wing unit. An elevator fin 12 bears a slit 9 which operates in the same manner. Rudder 22 and a fin 12 form an empennage ensuring flight control. Quite at the rear, there is a nozzle 10 permitting air 11 to escape and which is used as a reactor;

Fig. 4 is section across the front edge of a wing unit 18 showing with more details slit 2 through which air 3 escapes coming from the chamber 17. In this section, the direction of the median plane emergence 14 of the air 3 is at an angle α with the tangent 15 drawn to the enveloping profile 16 at wing 18 at the intersection of the median plane of emergence 14. This angle α should be as above-mentioned, between 25° and 75°. One of the rims of slit 2 is extended with flat surfaces 19 which continually deviate away from the direction 14 of the outlet of the slit. The other rim terminates as a lip near the outlet and is a part of the extension of the lower surface 7 of the wing unit 18;

Figs. 5 and 6 are respectively a sectional view and a front view of the spindles 4 at the ends of the wing unit 18. The top surface 8 of the wing unit 18 bends around the center of curvature 23 and forms the lower side of the spindle joining the lower surface 7 of wing unit 18. Through slit 13, air 24 escapes from the chamber 26 and falls back upon 27 and 28, the top and bottom curved surfaces of spindle 4 respectively, owing to the action of the extended lip 25, in the same manner as does air 3 when escaping from the slit 2 of the wing 18 due to the fact that slit 13 is constructed in relation to enveloping profile 30 as slit 2 in relation to enveloping profile 16 (compare Figs. 4 and 5). Within the spindle 4, a cavity 29 can be used as a fuel tank;

Fig. 7 is a section across the rudder 22 having a part 32 rotatable around an axis 38; between the fixed part 37 and said rotatable part 32 is a clearance 33 through which the air may circulate to assure the non-shedding of air in order to increase the action of said rudder 22; on the front part of the front edge of the fixed part, there is a continuous slit 6, running along both sides of the surface of said rudder 22, blowing air 5 in the same manner as explained above with respect to the wing slits 2. Slit 6 is located, with respect to the front edge 35 of the rudder, at a distance ranging from $\frac{1}{24}$ to $\frac{5}{24}$ of the sum of length of the fixed element 37 and of the length of the rotatable element 32;

Fig. 8 shows a centrifugal compressor 39 which may advantageously be used for providing compressed air to the above-mentioned slits; said compressor comprises a rotor 41 driven by a driving shaft 40; on the rotor 41 are mounted blades 42 which, in turn, bear rings 43 substantially parallel to the outside face of rotor 41. When the rotor is rotated, it draws along air coming from 45, e.g. the front intake orifice of the aircraft. After having passed through the blades 42 and the rings 43, the compressed air 49 goes through fixed guide rings 48 to enter channel 50. A cylinder 56 can move parallel to shaft 40 and reduce the passage through channel 50 (when occupying the position shown by interrupted lines in the figure). It can, therefore, completely obstruct the channel 50; this cylinder, guided by the envelope 47, is used as an output regulator and even as an obturator;

Figs. 9 and 10 are diagrammatical views of an aircraft according to a second embodiment of the invention having a turbo-reactor. This aircraft 101 comprises a compressor 139 having a set of axial stakes which intakes and compresses air 145. After the first low-pressure stages 149, a portion of the air necessary for supplying the wings, the control members, etc., escapes through a channel 150; the remainder of the low pressure air passes through the high pressure stages 144 of the compressor and in the combustion chamber 146, this high pressure air is mixed with fuel and burnt. The resulting hot combustion gases drive the turbine 151 which, in turn, drives the compressor 139. The low pressure air which has been deviated by channel 150 supplies first of all the wings 118. When this air arrives at 117, it goes into a distributing chamber 152 and comes out through slits 102 organized as slits 2 of the first embodiment (particularly Fig. 4) to fall back, as shown in 103, upon the top surface or extrados 108 of the wing unit 118. Each wing unit 118 bears at the free extremity thereof a spindle-shaped body 104, blown at 124, a stabilizing flap 153, as well as a supersustaining flap 154. The remainder of low pressure air coming from 150 passes through 155 and along 157 in order to reach the air distributing chamber 158 for supplying the fins 112. From this chamber, the air escapes through fin slits 109 which turn along the edges of the ends at 109a in order to insure the continuity of the slit on both sides; the air falls back at 136 while enveloping the surface of said fins 112 and permits a more active action of the movable fin flaps 134. Meanwhile, the hot combustion gases escaping from the turbine 151 pass through annular duct 136 in order to receive therein, if necessary, a further injection of fuel, and reach nozzle 110; the gases leave nozzle 110 through the exhaust orifice 159 and issue as a jet stream 111;

The rear portion is shown in an enlarged scale in Fig. 10: Envelope 160 is tapered so as to form a constricted passage at 159 through which the combustion gases issue. A control pear-shaped member 161, longitudinally displaced by link 162 and control means 163, maintains an adjustable constriction in the rear zone of nozzle 110 wherein the combustion gases 164 pass before issuing as a jet 111.

Figure 11:
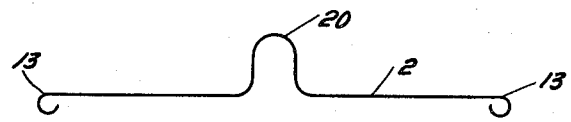
Figs. 11 and 12 are diagramamtical views of the aspect of the slits according to the invention on various types of wings.

Fig. 11 shows a slit 2 on the wing unit of a single-engine monoplane, corresponding to the diagrammatical view of Fig. 1. It is seen that this slit 2 as seen when looking at the front of the aircraft partially surrounds the spindle 4 at 13 and passes over the cockpit at 20.

Figure 12:
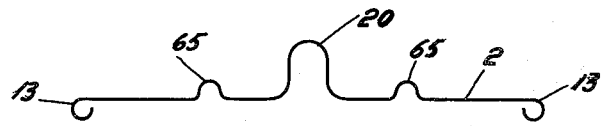

Fig. 12 shows the slit on the wing of a double-engine monoplane where the engine bonnets are inserted in the wing. This slit 2 is the same as that of the foregoing figure, except that it passes over the engines at 65.

Figure 13:
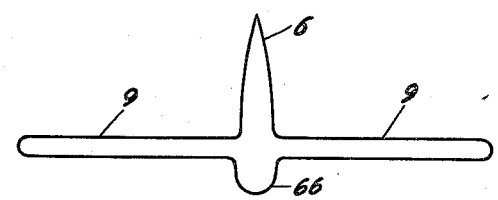
Figs. 13 and 14 show slits according to the invention on control members (either fixed or movable fin).

Fig. 13 shows a continuous slit on both sides of a perpendicular fin slit 6 and of the horizontal fin slit 9, and a portion of the rear part of the fuselage slit 66.

Figure 14:
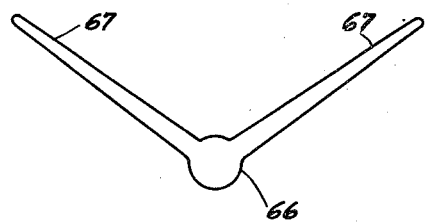

Fig. 14 shows the continuous slit 67 mounted on V-shaped rudders and the slit 66 of the fuselage which are used as well for direction control as for elevation control.

In viewing Figs. 1, 2 and 3, or 10, it is seen that when the compressor arranged within the airplane has been started, the airplane is enveloped in air which is blown from within the machine and which is distributed into the various slits through the lines set up to this purpose.

When the air thus blown reaches a predetermined relatively low value, the airplane is simply enveloped in the flowing air and remains at a standstill. As soon as this value rises, a more pronounced vacuum is produced at the front of the blown parts of the airplane, and as the vacuum increases with the displacement speed of the blown air, a sustentation is obtained. In fact, the air escaping from the slits of the wing, for example, follows up the flat surfaces by creating a vacuum towards the front part, and falls back on the upper wing surface. With an aircraft having oblique wing elements, a mere sustentation is obtained; but with aircraft having substantially horizontal wings, the air which has fallen back upon the upper wing surface or extrados contributes to exert a propulsive thrust on said wing. An aircraft according to the invention is able therefore to make a substantially vertical take-off in case of sustentation (oblique wings), and move forward due to the air issuing through the slits in the case of horizontal wings.

Nozzle 10 or 110 which can be adjoined to the split system contributes to the thrust which is necessary for bringing the airplane into motion.

What I claim is:

1. In an aircraft comprising a fuselage, wing elements fixedly secured to said fuselage, an empennage including fixed tail fins, a fluid compressor unit, continuous narrow slits of the COANDA type extending around said fuselage forward of said wing elements and along the leading edge of the said fixed tail fins, said slits being adapted to direct emerging fluid rearwardly, continuous narrow slits of the COANDA type extending along the leading edge of said wing elements, said last-mentioned slits being adapted to direct emerging fluid rearwardly along the extrados of said wing elements, and conduit means for delivering through all of said slits, at a pressure of at least 40 gms./sq. cm., fluid compressed in said compressor unit.

2. In an aircraft comprising a fuselage, wing elements fixedly secured to said fuselage, said wing elements comprising involute extensions at the wing tips terminating at the lower surface of said wing elements, an empennage including fixed tail fins and articulate rudder and elevator means on said fixed tail fins, a fluid compressor unit, continuous narrow slits of the COANDA type extending around the nose of said fuselage and around a major portion of said involute extensions of said wing elements, and along the leading edge of said fixed tail fins, said slits being adapted to direct emerging fluid rearwardly, continuous narrow slits of the COANDA type extending along the leading edge of said wing elements, said last-mentioned slits being adapted to direct emerging fluid rearwardly along the extrados of said wing elements, and conduit means for delivering through all of said slits, at a pressure of at least 40 gms./sq. cm., fluid compressed in said compressor unit.

3. In an aircraft as claimed in claim 2, the angle between the median plane of emergence through said slits along said leading edges of said tail fins and said wing elements and the corresponding tangent plane to said tail fins and wing elements respectively is comprised between 25° and 75° and the longitudinal axis of said slits along said leading edges is located on the upper portion of said tail fins and said wing elements rearwardly of the leading edge thereof, at a distance ranging from $1/24$ to $5/24$ of the distance from the leading edge to the trailing edge of the wings and at a distance ranging from $1/24$ to $5/24$ of the distance from the leading edge of the fixed tail fins to the trailing edge of the articulate rudder and elevator means on the fixed tail fins.

References Cited in the file of this patent

UNITED STATES PATENTS

| | | |
|---|---|---|
| 1,887,148 | De Ganahl | Nov. 8, 1932 |
| 1,903,818 | Jutting | Apr. 18, 1933 |
| 2,052,869 | Coanda | Sept. 1, 1936 |
| 2,252,657 | Zap | Aug. 12, 1941 |
| 2,271,321 | Wagner | Jan. 27, 1942 |
| 2,383,385 | Heintze | Aug. 21, 1945 |
| 2,396,911 | Anxionnaz et al. | Mar. 19, 1946 |
| 2,650,666 | Dorand | Sept. 1, 1953 |

FOREIGN PATENTS

| | | |
|---|---|---|
| 132,846 | Sweden | Sept. 4, 1951 |
| 518,663 | Great Britain | Mar. 5, 1940 |
| 980,347 | France | Dec. 27, 1950 |